US012779455B2

(12) United States Patent
Fleming

(10) Patent No.: US 12,779,455 B2
(45) Date of Patent: Nov. 3, 2026

(54) BLOOD GLUCOSE TESTING DEVICE

(71) Applicant: Barbara Fleming, Aurora, CO (US)

(72) Inventor: Barbara Fleming, Aurora, CO (US)

( * ) Notice: Subject to any disclaimer, the term of this patent is extended or adjusted under 35 U.S.C. 154(b) by 495 days.

(21) Appl. No.: 18/538,058

(22) Filed: Dec. 13, 2023

(65) Prior Publication Data

US 2025/0196128 A1 Jun. 19, 2025

(51) Int. Cl.
*B01L 3/00* (2006.01)

(52) U.S. Cl.
CPC ....... *B01L 3/5023* (2013.01); *B01L 2200/025* (2013.01); *B01L 2200/04* (2013.01); *B01L 2300/0663* (2013.01); *B01L 2300/069* (2013.01); *B01L 2300/0825* (2013.01)

(58) Field of Classification Search
CPC ........... B01L 2200/025; B01L 2200/04; B01L 2300/0663; B01L 2300/069; B01L 2300/0825; B01L 3/5023; G01N 33/4875
See application file for complete search history.

(56) References Cited

U.S. PATENT DOCUMENTS

| | | | | |
|---|---|---|---|---|
| 8,696,597 | B2 | 4/2014 | Neel | |
| 10,656,112 | B2 | 5/2020 | Reynolds | |
| 11,307,193 | B1 | 4/2022 | Stanley | |
| 2003/0223906 | A1 | 12/2003 | McAllister | |
| 2014/0001044 | A1 * | 1/2014 | Ecoff | A61B 90/00 221/258 |
| 2015/0160186 | A1 | 6/2015 | Garner-Richards | |

* cited by examiner

*Primary Examiner* — Jennifer Wecker

(57) ABSTRACT

A blood glucose testing device for hygienically loading and disposing of a test strip includes a test strip having a magnetically active tip having a magnetically active strip material. A blood glucose tester has an interior space. A power source and a central processing unit are positioned in the interior space. A channel extends into the interior space. The test strip is positionable within the channel. An electromagnet positioned in the interior space is electrically coupled to the central processing unit. The electromagnet is magnetically attracted to the magnetically active strip material whereby the electromagnet releasably retains the test strip. The electromagnet the test strip through the channel when the test strip is magnetically retained by the electromagnet. A chamber is positioned in the interior space beneath the channel. The test strip falls into the chamber when the test strip is released by the electromagnet.

15 Claims, 7 Drawing Sheets

BLOOD GLUCOSE TESTING DEVICE

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to diabetic testing systems and more particularly pertains to a new diabetic testing system for hygienically loading and disposing of a test strip.

(2) Description of Related Art Including Information Disclosed Under 37 CFR 1.97 and 1.98

The prior art relates to diabetic testing systems. Typically, a user needs to grab the test strip with their hands to load the test strip into the blood glucose testing device. This means that the user needs to physically handle the test strip where the blood sample is being gathered. When the user is assisting another patient, physically touching the test strip can carry a risk of exposure to another person's blood and other bodily fluids, which can cause infection and illness. When the user is testing their own blood, the user still needs to perform the unsanitary task of physically handling a test strip that is covered in blood. Thus, there is a need in the art for an automatic, hands-free mechanism for loading and disposing of a test strip used with a blood glucose testing device.

(h) BRIEF SUMMARY OF THE INVENTION

An embodiment of the disclosure meets the needs presented above by generally comprising a test strip having a magnetically active tip. The magnetically active tip comprises a magnetically active strip material. A blood glucose tester has a front side, a back side, and a peripheral side that is coupled to and extends between the front side and the back side to define an interior space. The peripheral side has a top edge and a bottom edge. A power source is positioned in the interior space. A central processing unit is positioned in the interior space. The central processing unit is electrically coupled to the power source. A channel extends into the interior space through the top edge. The channel has a shape that is complementary to a shape of the test strip wherein the test strip is positionable within the channel. An electromagnet is positioned in the interior space. The electromagnet is electrically coupled to the central processing unit. The electromagnet is magnetically attracted to the magnetically active strip material whereby the electromagnet releasably retains the test strip to the electromagnet. The electromagnet is movably coupled to the interior space and is aligned with the channel wherein the electromagnet moves the test strip through the channel when the test strip is magnetically retained by the electromagnet. A chamber is positioned in the interior space. The chamber is fluidly coupled with the channel. The chamber is positioned beneath the channel wherein the test strip falls into the chamber when the test strip is released by the electromagnet.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 2:
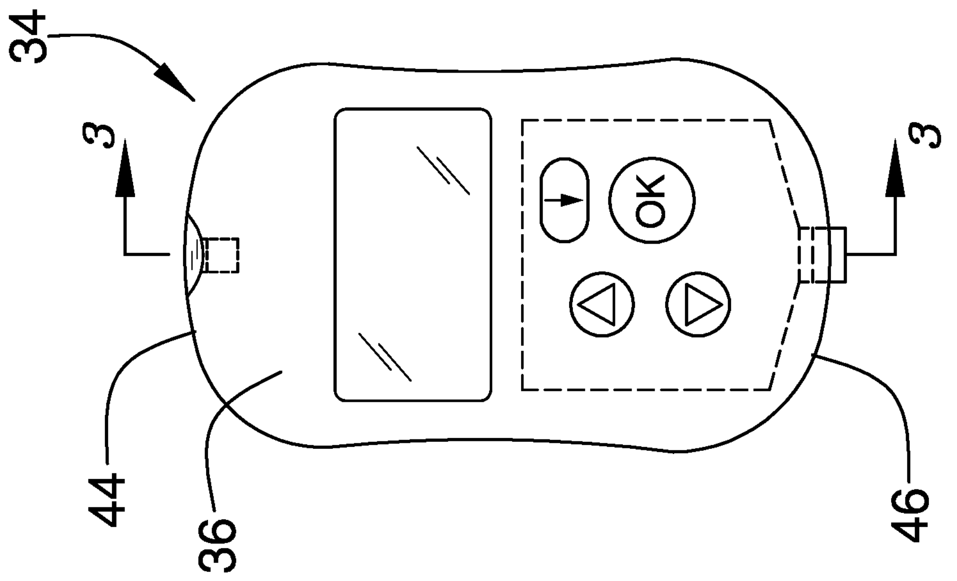
FIG. 2 is a top view of an embodiment of the disclosure.
Figure 1:
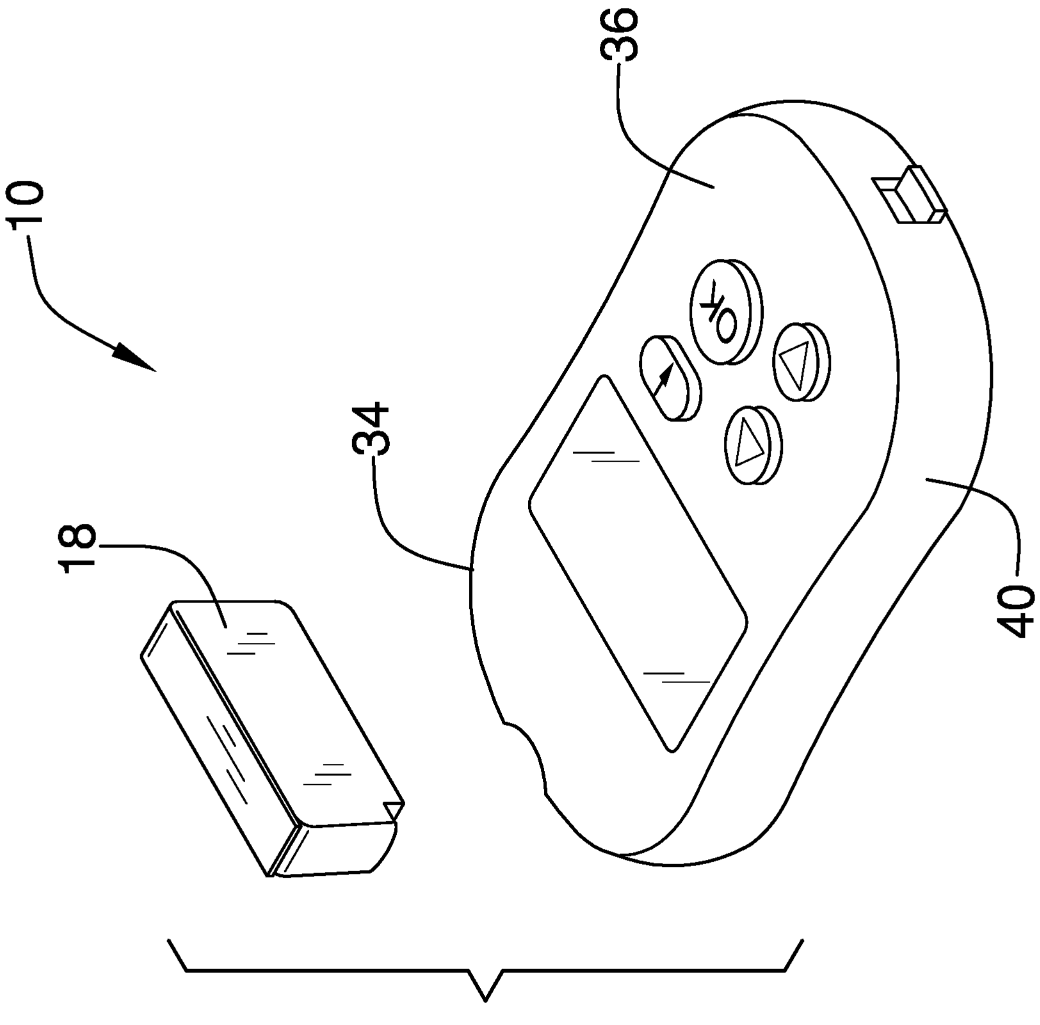
FIG. 1 is a top isometric view of a blood glucose testing device according to an embodiment of the disclosure.
Figure 3:
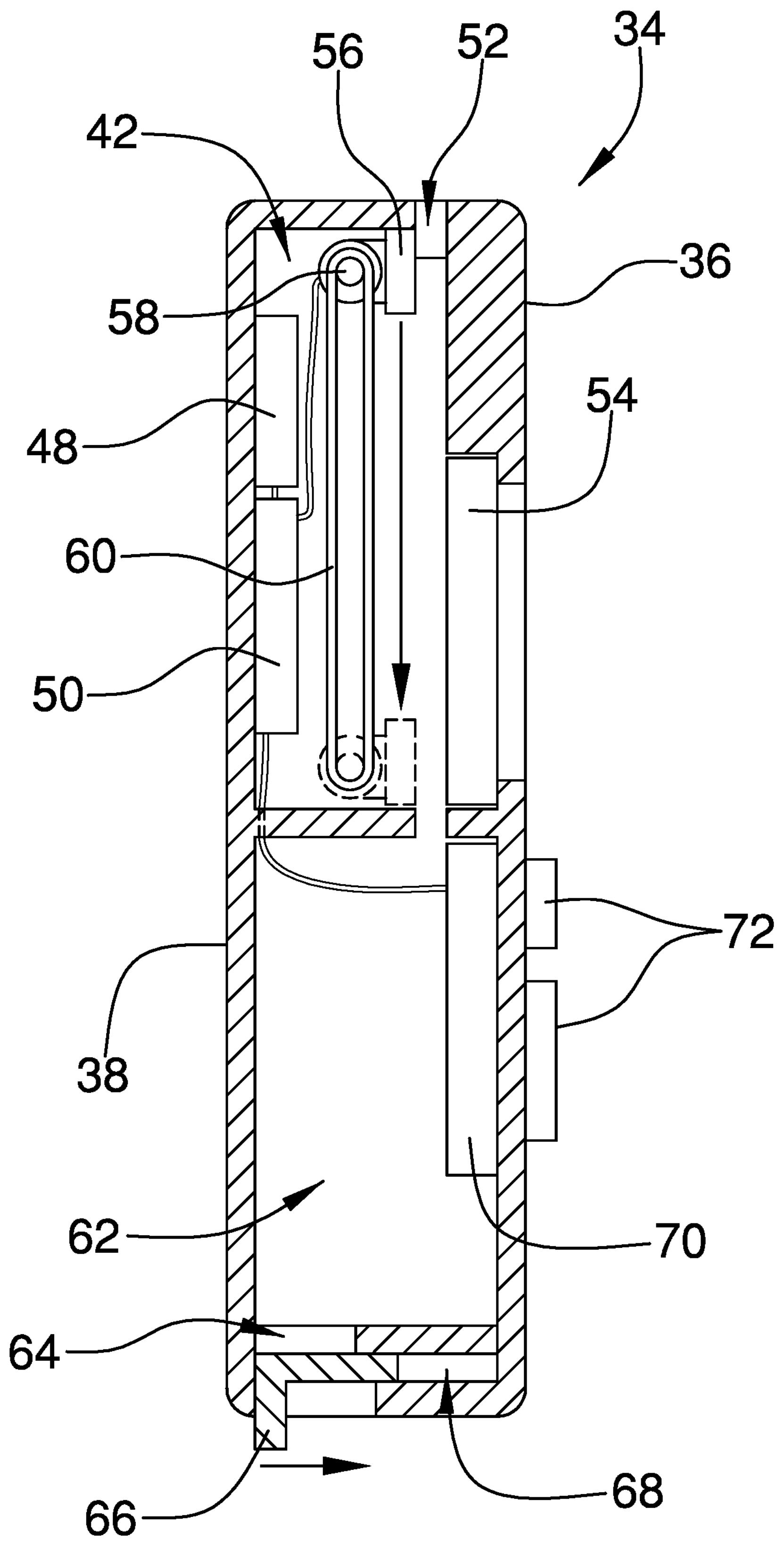
FIG. 3 is a cross-sectional view of an embodiment of the disclosure.
Figure 4:
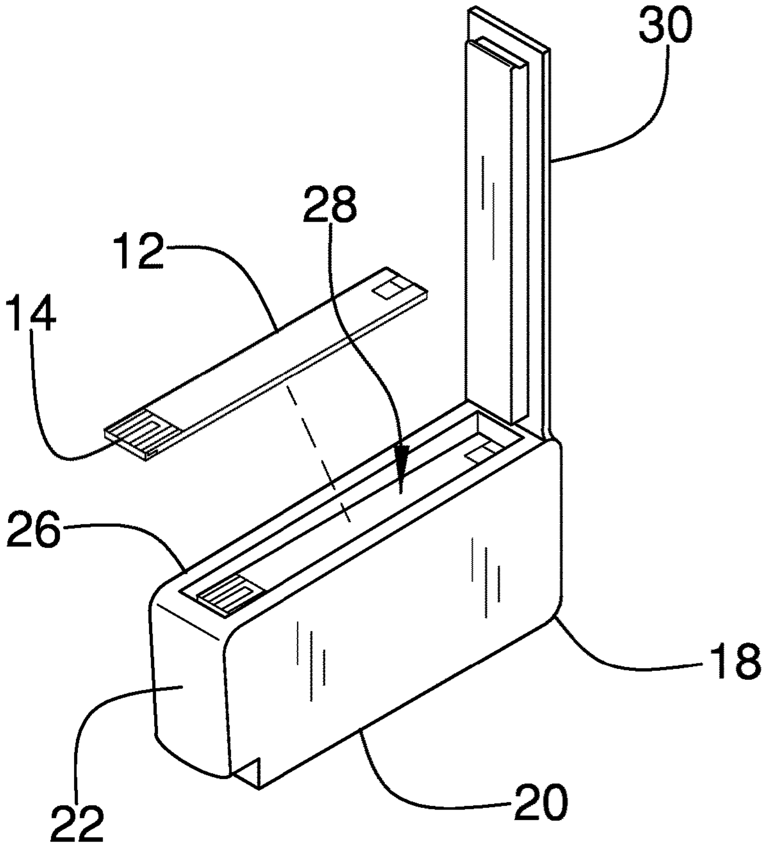
FIG. 4 is a top isometric view of an embodiment of the disclosure.
Figure 5:
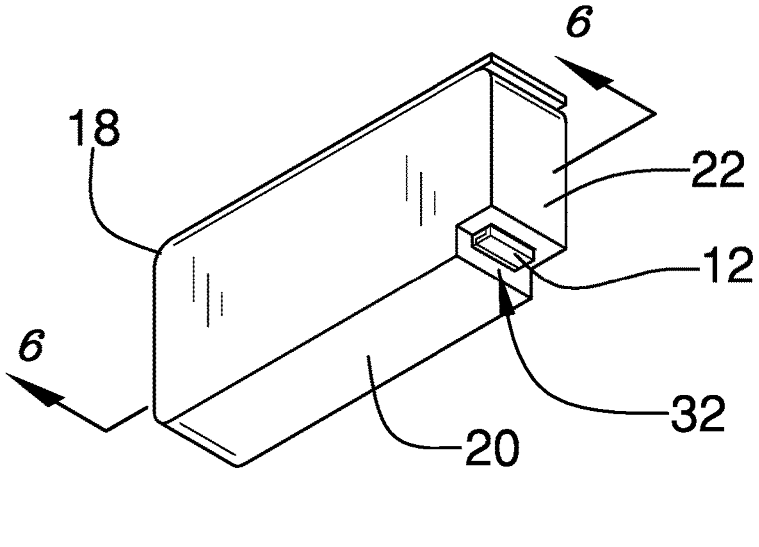
FIG. 5 is a bottom isometric view of an embodiment of the disclosure.
Figure 6:
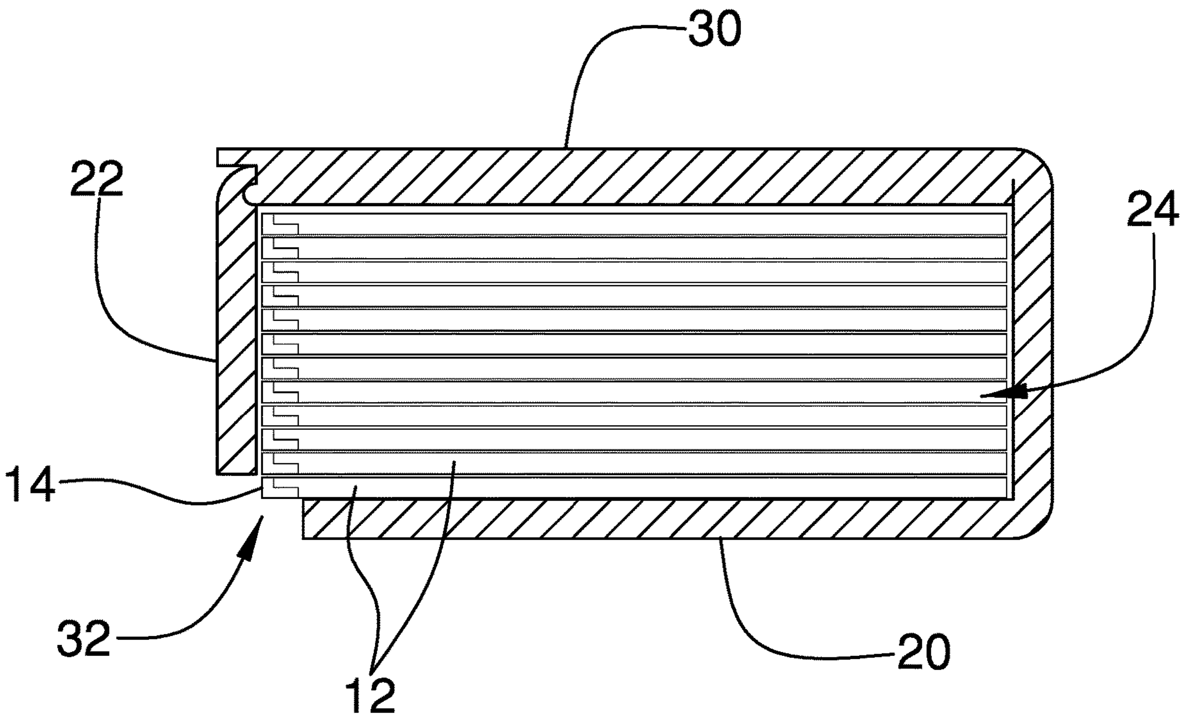
FIG. 6 is a cross-sectional view of an embodiment of the disclosure.
Figure 7:
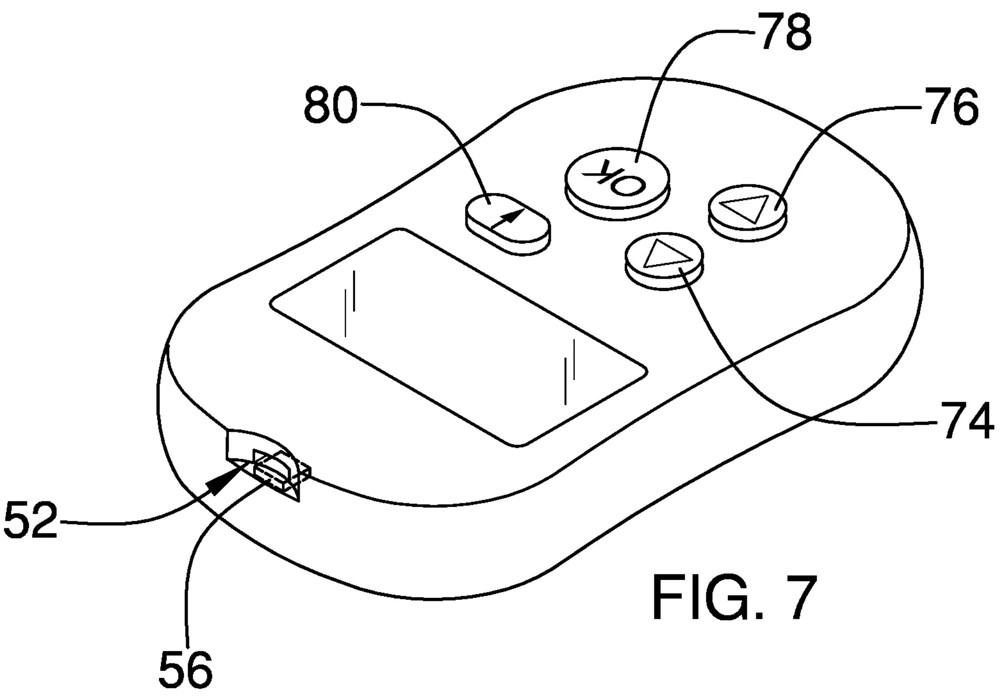
FIG. 7 is a front isometric view of an embodiment of the disclosure.
Figure 8:
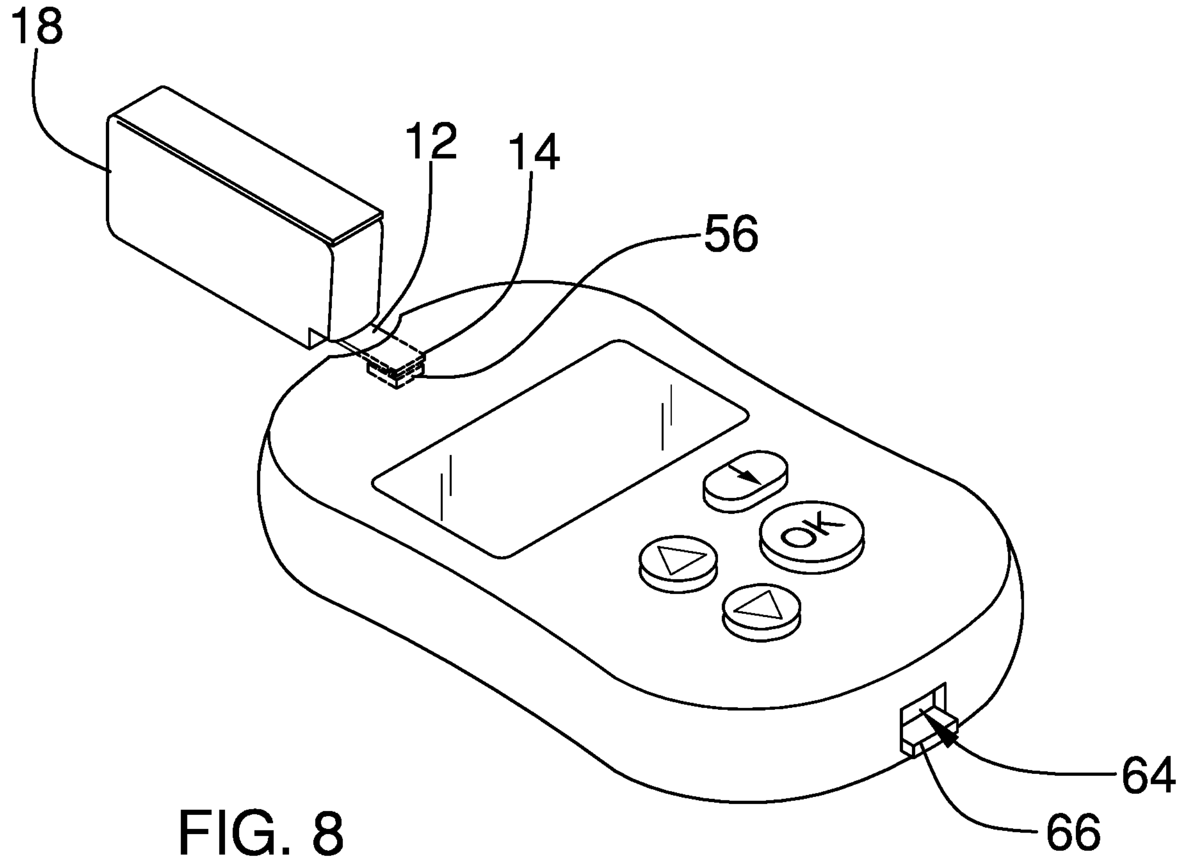
FIG. 8 is an in-use view of an embodiment of the disclosure.

With reference now to the drawings, and in particular to FIGS. 1 through 10 thereof, a new diabetic testing system embodying the principles and concepts of an embodiment of the disclosure and generally designated by the reference numeral 10 will be described.

As best illustrated in FIGS. 1 through 10, the blood glucose testing device 10 generally comprises a test strip 12 having a magnetically active tip 14. The magnetically active tip 14 generally comprises a magnetically active strip material. The test strip 12 is configured to receive a blood sample of a user 16.

A strip holder 18 has a bottom wall 20 and a perimeter wall 22 that is coupled to and extends upwardly from the bottom wall 20 to define an inner area 24. The inner area 24 has a shape that is complementary to a shape of the test strip 12 wherein the test strip 12 is positionable in the inner area 24. The perimeter wall 22 has an upper edge 26 defining an opening 28 into the inner area 24. A lid 30 may be pivotably coupled to the upper edge 26 to selectively close the opening 28.

A slot 32 is generally positioned in the bottom wall 20 and extends into the inner area 24. The slot 32 has a shape that is complementary to a shape of the test strip 12 wherein the test strip 12 is dispensable from the inner area 24 through the slot 32. The magnetically active tip 14 may be aligned with the slot 32 when the test strip 12 is positioned within the inner area 24.

A blood glucose tester 34 has a front side 36, a back side 38, and a peripheral side 40 that is coupled to and extends between the front side 36 and the back side 38 to define an interior space 42. The peripheral side 40 has a top edge 44 and a bottom edge 46.

A power source 48 is positioned in the interior space 42. The power source 48 may be a battery, such as a rechargeable battery or a replaceable battery.

A central processing unit 50 is positioned in the interior space 42. The central processing unit 50 is electrically coupled to the power source 48.

A channel 52 extends into the interior space 42 through the top edge 44. The channel 52 has a shape that is complementary to a shape of the test strip 12 wherein the test strip 12 is positionable within the channel 52.

A blood glucose reader 54 is positioned in the interior space 42. The blood glucose reader 54 is generally aligned with the channel 52 wherein the blood glucose reader 54 is configured to determine a blood glucose level of the blood sample being provided on the test strip 12.

An electromagnet 56 is positioned in the interior space 42. The electromagnet 56 is electrically coupled to the central processing unit 50. The electromagnet 56 is magnetically attracted to the magnetically active strip material on the test strip 12. For example, the magnetically active strip material may comprise a ferromagnetic material that is magnetically attracted to the electromagnet 56, such as iron, nickel, cobalt, gadolinium, or steel alloy.

The electromagnet 56 releasably retains the test strip 12 to the electromagnet 56. The electromagnet 65 is movably coupled to the interior space 42 and is aligned with the channel 52. The electromagnet 56 moves the test strip 12 through the channel 52 when the test strip 12 is magnetically retained by the electromagnet 56.

A motor 58 is positioned in the interior space 42. The motor 58 is electrically coupled to the central processing unit 50. The motor 58 may be a servomotor.

A track 60 couples the electromagnet 56 to the motor 58. The motor 58 moves the electromagnet 56 along the track 60. The track 60 is aligned with the channel 52 wherein the electromagnet 56 moves adjacent to the channel 52. Thus, the electromagnet 56 moves the test strip 12 through the channel 52.

A chamber 62 may be positioned in the interior space 42. The chamber 62 is fluidly coupled with the channel 52. The chamber 62 is generally positioned beneath the channel 52 wherein the test strip 12 falls into the chamber 62 when the test strip 12 is released by the electromagnet 56.

A port 64 may be positioned in the bottom edge 46. The port 64 is fluidly coupled with the chamber 62. The port 64 has a shape that is complementary to a shape of the test strip 12 wherein the test strip 12 is removable from the chamber 62 through the port 64.

A door 66 may be slidably coupled to the bottom edge 46. The door 66 is positionable over the port 64 to inhibit access to the chamber 62. The door 66 may be nested in the bottom edge 46 wherein a recess 68 extends into the bottom edge 46 for receiving the door 66 when the door 66 is open.

A control panel 70 may be electrically coupled to the central processing unit 50 for selectively actuating the electromagnet 56 and the blood glucose reader 34. The control panel 70 may comprise a plurality of buttons 72 that is positioned on the front side 36 of the blood glucose tester 34. For example, the plurality of buttons 72 may include an up button 74 that is configured to actuate the motor 58 to move the electromagnet 56 upwardly along the track 60 through the interior space 42 toward the top edge 44. A down button 76 may be configured to actuate the motor 58 to move the electromagnet 56 downwardly along the track 60 through the interior space 42 toward the bottom edge 46. An ok button 78 may be configured to actuate the blood glucose reader 54. A release button 80 may be configured to deactivate the electromagnet 56 wherein the electromagnet 56 releases the test strip 12 when the electromagnet 56 is deactivated.

Figure 9:
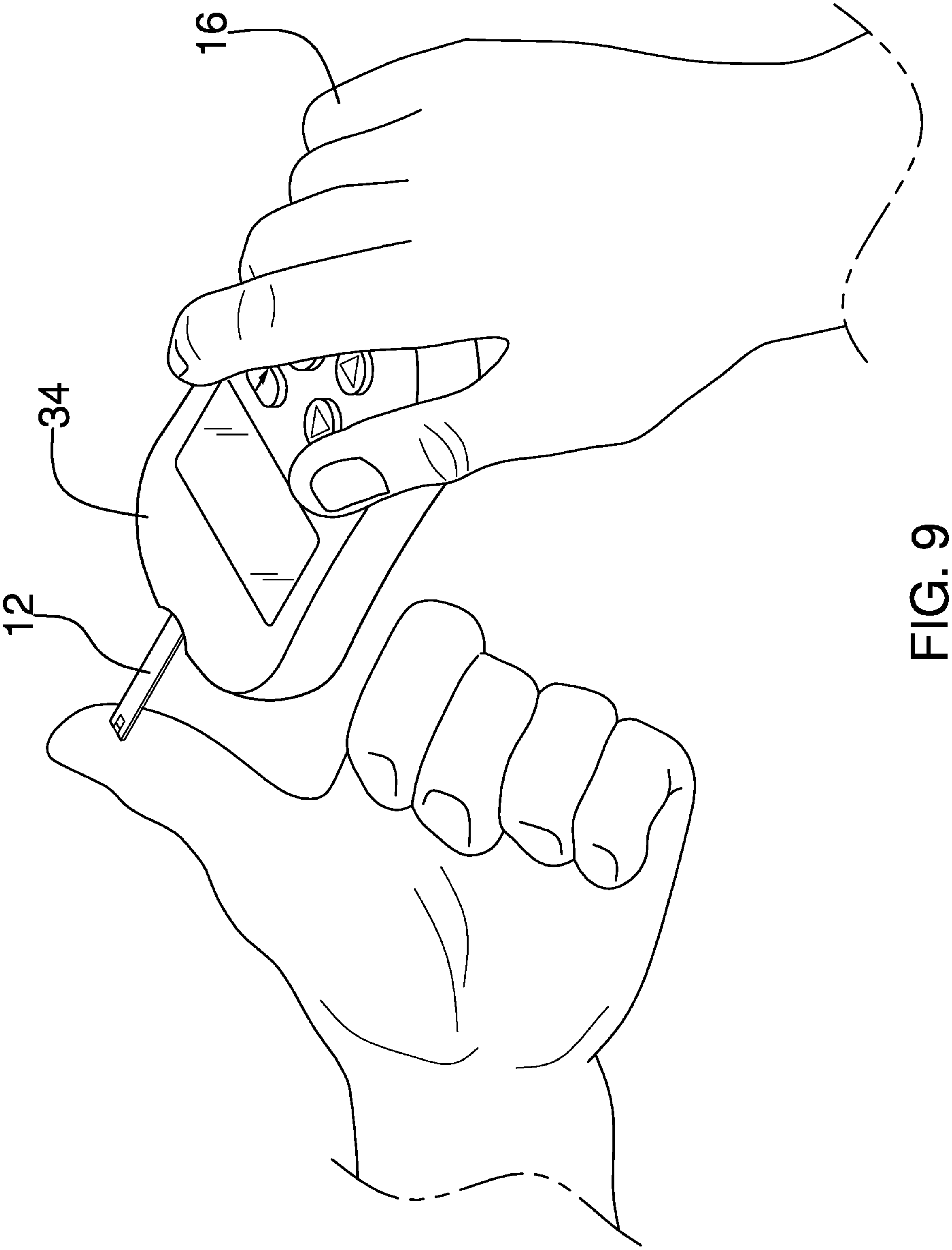
FIG. 9 is an in-use view of an embodiment of the disclosure.
Figure 10:
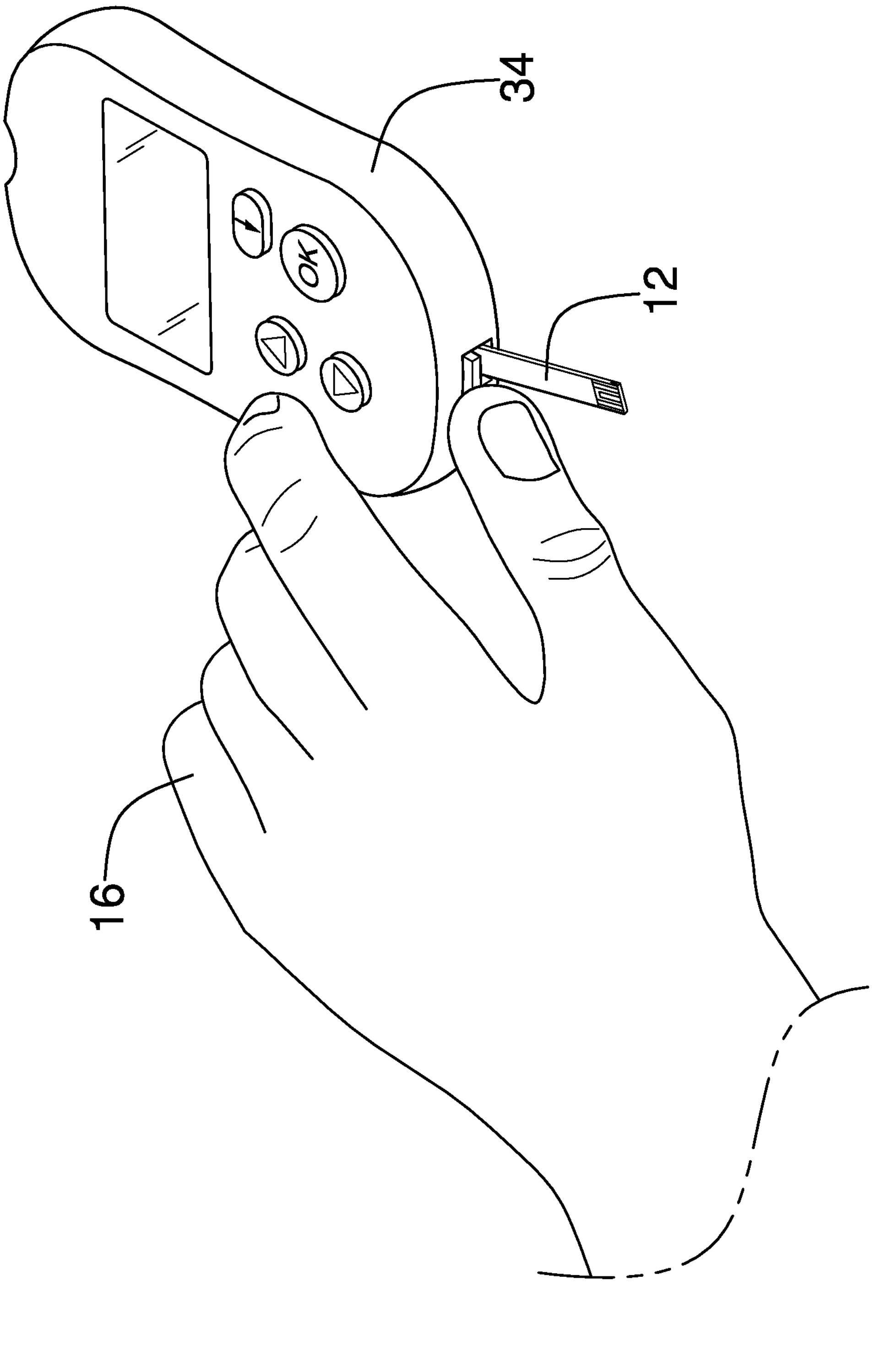
FIG. 10 is an in-use view of an embodiment of the disclosure.

In use, the user 16 can position the strip holder 18 near the blood glucose tester 34. More specifically, the user 16 may align the slot 32 of the strip holder 18 with the channel 52 in the top edge 44 of the blood glucose tester 34. Once the electromagnet 56 receives an electrical current from the power source 48, for example when the user 16 actuates the electromagnet 56 with the control panel 70, the electromagnet 56 will releasably retain the test strip 12. The test strip 12 can then slide out of the strip holder 18 without being touched by the user 16. The user 16 can then add a blood sample to the test strip 12 as shown in FIG. 9. The user 16 can use the control panel 70 to move the test strip 12 into the interior space 42 of the blood glucose tester 34. For example, the user 16 can press the down button 76 to move the electromagnet 56, and the test strip 12, downwardly through the channel 52. The user 16 can then press the ok button 78 to actuate the blood glucose reader 54. After the blood glucose level is determined, the user 16 can press the release button 80 to deactivate the electromagnet 56 and release the test strip 12 into the chamber 62. The user 16 can open the door 66 to expose the port 64 and dispose of the test strip 12 without needing to physically handle the test strip 12. In some embodiments, the user 16 can collect multiple test strips 12 in the chamber 62 before releasing the used test strip 12 outwardly through the port 64.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A blood glucose testing system comprising:

a test strip having a magnetically active tip, the magnetically active tip comprising a magnetically active strip material; a blood glucose tester having a front side, a back side, and a peripheral side being coupled to and extending between the front side and the back side to define an interior space, the peripheral side having a top edge and a bottom edge;

a power source being positioned in the interior space;

a central processing unit being positioned in the interior space, the central processing unit configured to be electrically coupled to the power source;

a channel extending into the interior space through the top edge, the channel having a shape being complementary to a shape of the test strip, such that the test strip is con configured to be positioned within the channel;

an electromagnet being positioned in the interior space, the electromagnet configured to be electrically coupled to the central processing unit, the electromagnet configured to be magnetically attracted to the magnetically active strip material whereby the electromagnet is configured to releasably retain the test strip to the electromagnet, the electromagnet configured to be movably coupled to the interior space and being aligned with the channel, wherein the electromagnet is configured to move the test strip through the channel when the test strip is magnetically retained by the electromagnet; and a chamber being positioned in the interior space, the chamber being fluidly coupled with the channel, the chamber being positioned beneath the channel, and wherein the test strip falls into the chamber when the test strip is released by the electromagnet.

2. The blood glucose testing system of claim 1, further comprising: a strip holder having a bottom wall and a perimeter wall coupled to and extending upwardly from the bottom wall to define an inner area, the inner area having a shape being complementary to a shape of the test strip wherein the test strip is configured to be positioned in the inner area, the perimeter wall having an upper edge defining an opening into the inner area; and a lid configured to be pivotably coupled to the upper edge to selectively close the opening.

3. The blood glucose testing system of claim 2, further comprising a slot being positioned in the bottom wall and extending into the inner area, the slot having a shape being complementary to a shape of the test strip wherein the test strip is dispensable from the inner area through the slot.

4. The blood glucose testing system of claim 1, wherein the power source is a battery.

5. The blood glucose testing system of claim 1, wherein the motor is a servomotor.

6. The blood glucose testing system of claim 1, further comprising a blood glucose reader being positioned in the interior space, the blood glucose reader being aligned with the channel, and wherein the blood glucose reader is configured to determine a blood glucose level of the blood sample being provided on the test strip.

7. The blood glucose testing system of claim 1, further comprising: a motor being positioned in the interior space, the motor configured to be electrically coupled to the central processing unit; and a track coupling the electromagnet to the motor, the motor moving the electromagnet along the track, the track being aligned with the channel, and wherein the electromagnet moves adjacent to the channel whereby the electromagnet moves the test strip through the channel.

8. The blood glucose testing system of claim 7, further comprising a control panel configured to be electrically coupled to the central processing unit, and configured for selectively activating the electromagnet and the blood glucose reader, the control panel comprising a plurality of buttons being positioned on the front side of the blood glucose tester, the plurality of buttons including: an up button being configured to actuate the motor to move the electromagnet upwardly along the track through the interior space toward the top edge; a down button being configured to actuate the motor to move the electromagnet downwardly along the track through the interior space toward the bottom edge; an ok button being configured to actuate the blood glucose reader; and a release button being configured to deactivate the electromagnet wherein the electromagnet releases the test strip when the electromagnet is deactivated.

9. The blood glucose testing system of claim 1, further comprising: a port positioned in the bottom edge, the port configured to be fluidly coupled with the chamber, the port having a shape complementary to a shape of the test strip wherein the test strip is removable from the chamber through the port.

10. The blood glucose testing system of claim 9, further comprising a door configured to be movably coupled to the bottom edge, the door configured to be positioned over the port to inhibit access to the chamber.

11. The blood glucose testing system of claim 10, wherein the door is nested in the bottom edge, and wherein a recess extends into the bottom edge for receiving the door when the door is open.

12. The blood glucose testing system of claim 1, further comprising a control panel configured to be electrically coupled to the central processing unit for selectively actuating the electromagnet.

13. The blood glucose system of claim 12, the control panel further comprising a plurality of buttons positioned on the front side of the blood glucose tester.

14. The blood glucose system of claim 13, the plurality of buttons further comprising:

an up button being configured to move the electromagnet upwardly through the interior space toward the top edge;

a down button being configured to move the electromagnet downwardly through the interior space toward the bottom edge; and a release button being configured to deactivate the electromagnet wherein the electromagnet releases the test strip when the electromagnet is deactivated.

15. A blood glucose testing system comprising:

a test strip having a magnetically active tip, the magnetically active tip comprising a magnetically active strip material, the test strip being configured to receive a blood sample of a user; a strip holder having a bottom wall and a perimeter wall being coupled to and extending upwardly from the bottom wall to define an inner area, the inner area having a shape being complementary to a shape of the test strip, such that the test strip is configured to be positioned in the inner area, the perimeter wall having an upper edge defining an opening into the inner area;

a lid configured to be pivotably coupled to the upper edge to selectively close the opening; a slot being positioned in the bottom wall and extending into the inner area, the slot having a shape being complementary to a shape of the test strip, and wherein the test strip is configured to be dispensed from the inner area through the slot;

a blood glucose tester having a front side, a back side, and a peripheral side being coupled to and extending between the front side and the back side to define an interior space, the peripheral side having a top edge and a bottom edge;

a power source being positioned in the interior space, the power source being a battery;

a central processing unit being positioned in the interior space, the central processing unit configured to be electrically coupled to the power source;

a channel extending into the interior space through the top edge, the channel having a shape being complementary to a shape of the test strip wherein the test strip is configured to be positioned within the channel;

a blood glucose reader being positioned in the interior space, the blood glucose reader being aligned with the channel wherein the blood glucose reader is configured to determine a blood glucose level of the blood sample being provided on the test strip;

an electromagnet configured to be positioned in the interior space, the electromagnet configured to be electrically coupled to the central processing unit, the electromagnet being magnetically attracted to the magnetically active strip material, whereby the electromagnet is configured to releasably retain the test strip to the electromagnet, the electromagnet configured to be movably coupled to the interior space and aligned with the channel, wherein the electromagnet is configured to move the test strip through the channel when the test strip is magnetically retained by the electromagnet;

a motor configured to be positioned in the interior space, the motor being electrically coupled to the central processing unit, the motor being a servomotor;

a track configured to couple the electromagnet to the motor, the motor configured to move the electromagnet along the track, the track aligned with the channel, and wherein the electromagnet is configured to move adjacent to the channel whereby the electromagnet moves the test strip through the channel;

a chamber positioned in the interior space, the chamber being fluidly coupled with the channel, the chamber being positioned beneath the channel, and wherein the test strip falls into the chamber when the test strip is released by the electromagnet;

a port positioned in the bottom edge, the port fluidly coupled with the chamber, the port having a shape complementary to a shape of the test strip, and wherein the test strip is configured to be removed from the chamber through the port;

a door configured to be slidably coupled to the bottom edge, the door being configured to be positioned over the port to inhibit access to the chamber, the door being nested in the bottom edge, and wherein a recess extends into the bottom edge for receiving the door when the door is open; a control panel configured to be electrically coupled to the central processing unit, and configured for selectively actuating the electromagnet and the blood glucose reader, the control panel comprising a plurality of buttons positioned on the front side of the blood glucose tester, the plurality of buttons including:

an up button being configured to actuate the motor to move the electromagnet upwardly along the track through the interior space toward the top edge; a down button being configured to actuate the motor to move the electromagnet downwardly along the track through the interior space toward the bottom edge; an ok button being configured to actuate the blood glucose reader; and a release button being configured to deactivate the electromagnet wherein the electromagnet releases the test strip when the electromagnet is deactivated.

* * * * *